(12) United States Patent
Imamura

(10) Patent No.: US 8,148,991 B2
(45) Date of Patent: Apr. 3, 2012

(54) EFFICIENT RESISTIVITY MEASUREMENT METHOD BY MULTI-POINT SIMULTANEOUS CURRENT TRANSMISSION SYSTEM USING PSEUDO-NOISE SIGNAL WAVEFORM

(75) Inventor: Sugio Imamura, Saitama (JP)

(73) Assignees: Yuugen Kaisha Chikentansa Gijutsukenkyusho, Saitama (JP); Ouyou Chishitsu Kabushiki Kaisha, Tokyo (JP)

( * ) Notice: Subject to any disclaimer, the term of this patent is extended or adjusted under 35 U.S.C. 154(b) by 264 days.

(21) Appl. No.: 12/601,347

(22) PCT Filed: May 29, 2008

(86) PCT No.: PCT/JP2008/059913
§ 371 (c)(1),
(2), (4) Date: Nov. 23, 2009

(87) PCT Pub. No.: WO2008/149774
PCT Pub. Date: Dec. 11, 2008

(65) Prior Publication Data
US 2010/0171486 A1 Jul. 8, 2010

(30) Foreign Application Priority Data
Jun. 8, 2007 (JP) ................................. 2007-152263

(51) Int. Cl.
*G01V 3/06* (2006.01)
*G01V 3/02* (2006.01)
*G01R 13/00* (2006.01)
(52) U.S. Cl. ...................... 324/358; 324/345; 324/140 R
(58) Field of Classification Search ............... 324/140 R, 324/345, 357–358
See application file for complete search history.

(56) References Cited

U.S. PATENT DOCUMENTS

| | | | | |
|---|---|---|---|---|
| 5,914,603 | A * | 6/1999 | Daily et al. | 324/357 |
| 6,182,013 | B1 * | 1/2001 | Malinverno et al. | 702/7 |
| 7,034,539 | B2 * | 4/2006 | Ueda et al. | 324/357 |
| 7,330,032 | B2 * | 2/2008 | Donnangelo | 324/452 |
| 7,573,780 | B2 * | 8/2009 | Thompson et al. | 367/14 |
| 7,859,266 | B2 * | 12/2010 | Lee | 324/358 |

(Continued)

FOREIGN PATENT DOCUMENTS
JP 2001-21662 1/2001

(Continued)

OTHER PUBLICATIONS
International Search Report issued Jul. 29, 2008 in International (PCT) Application No. PCT/JP2008/059913.

(Continued)

*Primary Examiner* — Huy Q Phan
*Assistant Examiner* — Joshua Benitez
(74) *Attorney, Agent, or Firm* — Wenderoth, Lind & Ponack, L.L.P.

(57) ABSTRACT

A method for significantly reducing measurement time for electrical resistivity profiling and logging without degrading the quality of the measurement includes simultaneously transmitting a current from multiple points to underground and carrying out mathematic processing to calculate a potential obtained when a current is transmitted independently from any transmission point, based on observed response potential waveforms. Further current waveforms having a covariance of zero are selected. Then, a possible response obtained independently at transmission point can be determined by dividing the covariance of the observed potential waveform and the current waveform by the variance of the current waveform. As the waveform zeroing the covariance, an M-sequence code with zero added to the end thereof is applied.

3 Claims, 3 Drawing Sheets

U.S. PATENT DOCUMENTS

| | | | |
|---|---|---|---|
| 2002/0060576 A1* | 5/2002 | Tominaga | 324/715 |
| 2002/0112855 A1* | 8/2002 | Arndt et al. | 166/250.15 |
| 2005/0093548 A1 | 5/2005 | Ueda et al. | |
| 2005/0114030 A1* | 5/2005 | Liu et al. | 702/11 |
| 2009/0278541 A1* | 11/2009 | Westerdahl et al. | 324/334 |

FOREIGN PATENT DOCUMENTS

| | | |
|---|---|---|
| JP | 2004-163322 | 6/2004 |
| JP | 2005-337746 | 12/2005 |
| WO | 2005/015262 | 2/2005 |

OTHER PUBLICATIONS

Sugio Imamura, "The possibility of an instantaneous resistivity profiling by the simultaneous multi-channel current injection using CDMA method (I: the principle and the experiment)", Proceedings of the 117$^{th}$ SEGJ Conference, by the Society of Exploration Geophysicists of Japan, Oct. 2007, pp. 219-222 (along with English Abstract).

"Butsuri-Tansa (Geophysical Exploration) Handbook", edited by Society of Exploration Geophysicists of Japan, 1998, Chapter 5, pp. 259-291.

Motoharu Jinguuji et al., "Development of Multi-transmission Electric Resistivity Tomography system and its application", Collection of Papers for the 114$^{th}$ Technical Conference of Society of Exploration Geophysicists of Japan, 2006, pp. 215-218.

Motoharu Jinguuji et al., "3D resistivity exploration using multi-transmission tomography system", Collection of Papers for the 115$^{th}$ Technical Conference of Society of Exploration Geophysicists of Japan, 2006, pp. 273-274.

* cited by examiner

EFFICIENT RESISTIVITY MEASUREMENT METHOD BY MULTI-POINT SIMULTANEOUS CURRENT TRANSMISSION SYSTEM USING PSEUDO-NOISE SIGNAL WAVEFORM

TECHNICAL FIELD OF THE INVENTION

The present invention relates to an electrical resistivity profiling method and an electrical resistivity logging method for measuring underground electrical characteristics.

BACKGROUND OF THE INVENTION

A complicated underground electrical characteristic distribution is conventionally measured by providing a plurality of current transmission points and potential measurement points on the surface of the ground or in the ground, selecting various combination of pairs of current point and potential measurement point, providing current transmission from the current point, observing potential response at the potential measurement point. However, the conventional method avoids simultaneous current transmission from multiple points and merely transmits a current from only one transmission point during one measurement process and therefore a current is not transmitted from multi-points simultaneously (see Patent Documents 1 and 2 and Non-Patent Document 1).

Thus, time required for measurement needs to have at least the value of time required for one measurement process multiplied by the number of transmission points and, accordingly, cost reduction is limited. Furthermore, in applications in which the flow condition of underground water is visualized based on a change and transition in underground electrical characteristics, rapidly changing phenomena cannot be captured. This results in limiting the scope and range of applications.

Studies have been reported which attempted to reduce the measurement time by simultaneous transmission from multiple points (Non-Patent Documents 2 and 3). However, the studies relate to a technique of a frequency divide multiple access (FDMA) type which uses different frequencies for the respective transmission points.

The underground electrical characteristics include different frequency response and vary with frequency. Thus, current transmission is desirably provided at the same frequency. However, for the FDMA type, the frequency essentially varies with the transmission point, thus precluding the response potentials from being measured at the same frequency. Furthermore, to allow an increase in the number of simultaneous transmission points, a wider range of transmission frequencies needs to be assigned to the transmission points. Thus, the number of simultaneous transmission points is limited. Moreover, the measurement of the response potentials requires a synchronous detection circuit, thus complicating the apparatus.

Under these circumstances, an efficient measurement method of electrical resistivity profiling has been required, which can provide simultaneous transmission at the same frequency.

Patent Document 1: Japanese Patent Laid-Open No. 2001-021662
Patent Document 2: Japanese Patent Laid-Open No. 2005-337746
Non-Patent Document 1: "Butsuri-Tansa (Geophysical Exploration)" edited by Society of Exploration Geophysicists of Japan, Chapter 5, pp. 259-291
Non-Patent Document 2: "Development of Multi-transmission Electric Resistivity Tomography System and its Application", Collection of Papers for the 114th Technical Conference of Society of Exploration Geophysicists of Japan, 2006, pp. 215-218
Non-Patent Document 3: "3D Resistivity Exploration Multi-transmission Tomography System", Collection of Papers for the 115th Technical Conference of Society of Exploration Geophysicists of Japan, 2006, pp. 273-274.

DISCLOSURE OF THE INVENTION

Problems to be Solved by the Invention

An object of the present invention is to solve the above-described problems with the conventional art, and to significantly reduce the measurement time for electrical profiling and electrical logging without degrading the quality of the measurement. In particular, the present invention aims to reduce the measurement time by using signals in the same frequency band to thereby simultaneously provide current transmission from multiple points so that, by using observed response potential waveforms and respective current waveforms, mathematic processing is carried out to calculate a possible potential response obtained when a current is transmitted from any single transmission point, thus reducing the conventional measurement time to the value of the conventional measurement time divided by the number of the transmission points.

Means for Solving the Problems

Responses to all the current waveforms are superimposed on the potential responses that are observed at the current transmission from the multiple points simultaneously. Thus, the responses need to be separated into response potentials for the respective transmission. For accurate separation, the correlation between the current waveforms needs to be close to zero.

A current waveform is defined as $S(i,j)$, and the response potential per unit transmission current is defined as $R(i)$. An observed potential waveform is defined as $P(j)$, the number of current transmission points is defined as m, and a current transmission wavelength (the number of data) is defined as n. Then, in terms of a matrix, the relationship among these elements is expressed as $S \times R = P$.

$$\begin{bmatrix} S_{11} & S_{21} & S_{i1} & \ldots & S_{m1} \\ S_{12} & \vdots & \vdots & \vdots & \vdots \\ S_{1j} & \vdots & S_{ij} & \vdots & \vdots \\ \vdots & \vdots & \vdots & \vdots & \vdots \\ S_{1n} & \ldots & \ldots & \ldots & S_{mn} \end{bmatrix} \begin{bmatrix} R_1 \\ R_2 \\ R_i \\ \vdots \\ R_m \end{bmatrix} = \begin{bmatrix} P_1 \\ P_2 \\ P_j \\ \vdots \\ P_n \end{bmatrix} \quad \text{[Expression 1]}$$

Solving the expression for $R(i)$ enables the response to each transmission to be determined, but it should be noted that whether or not the expression can be easily solved depends on the properties of the matrix S. However, when the covariance of the current waveforms is zero, the response can be easily and accurately determined.

The covariance $C(i)$ of $P(j)$ and $S(i,j)$ is determined by finding the sum of the values of multiplying $P(j)$ and from $S(i,j)$ after subtracting the average values, respectively, from them.

$$C(i) = \sum_{j=1}^{n} \{(P(j) - \overline{P}) \cdot (S(i, j) - \overline{S(i)})\} \quad \text{[Expression 2]}$$

Substitution of P(j)=S(i,j)×R(i) makes C(i) equal to the sum of the products of R(i) and the variance or covariance of S(i,j).

$$C(i) = \sum_{j=1}^{n} \left[ \left\{ \sum_{k=1}^{m} \{R(k) \cdot (S(k, j) - \overline{S(k)})\} \right\} \cdot (S(i, j) - \overline{S(i)}) \right] \quad \text{[Expression 3]}$$

Here, if the covariance is zero, R(i) is equal to C(i) divided by the variance S(i,j) and can thus be easily determined.

$$R(i) = \frac{C(i)}{\sum_{j=1}^{n} \{(S(i, j) - \overline{S(i)})^2\}} \quad \text{[Expression 4]}$$

Thus, even if multiple points are simultaneously selected for transmission, the response per unit current can be easily determined based on an observed potential waveform by selecting, for transmission, transmission current waveforms that makes it zero the covariance thereof. Waveforms zeroing the covariance belong to pseudo-noise signals (PN signals) for M-sequence codes or the like.

For an M-sequence code, a sequence with a length of $2^k-1$ can be created using k linear feedback shift registers having a feedback tap based on exclusive OR. Then, $2^k-1$ sequences can be created by shifting the created M-sequence. The M-sequence code itself fails to zero the covariance because of the properties thereof. However, adding zero to the end of the sequence allows the creation of waveforms zeroing the covariance for all combinations. An increase in the number of shift registers increases the length of the sequence. However, the number of sequences that can be created is proportional to the length. Thus, little limitation is imposed on the number of simultaneous transmission points.

Thus, to allow multiple points to be simultaneously transmitted, such transmission waveforms as zero the covariance thereof are selected. Then, a possible response obtained at the current transmission from the multipoints independently can be determined based on observed potential waveforms. As the waveforms zeroing the covariance, the M-sequence codes with zero added to the tail end thereof are applicable.

Advantages of the Invention

The present invention significantly reduces the measurement time for electrical resistivity profiling and logging. For example, it is assumed that in general two-dimensional resistivity profiling in which current transmission points and potential observation points are arranged on the surface of the ground, the number of transmission points is 100, and the number of potential measurement points per transmission point is 15. In this case, according to the conventional method, even with the simultaneous measurement channels, one minute is required for one transmission measurement, and the total required time is 100 minutes. In contrast, the present invention enables the measurement to be completed in one minute.

DESCRIPTION OF REFERENCE SYMBOLS

Figure 1:
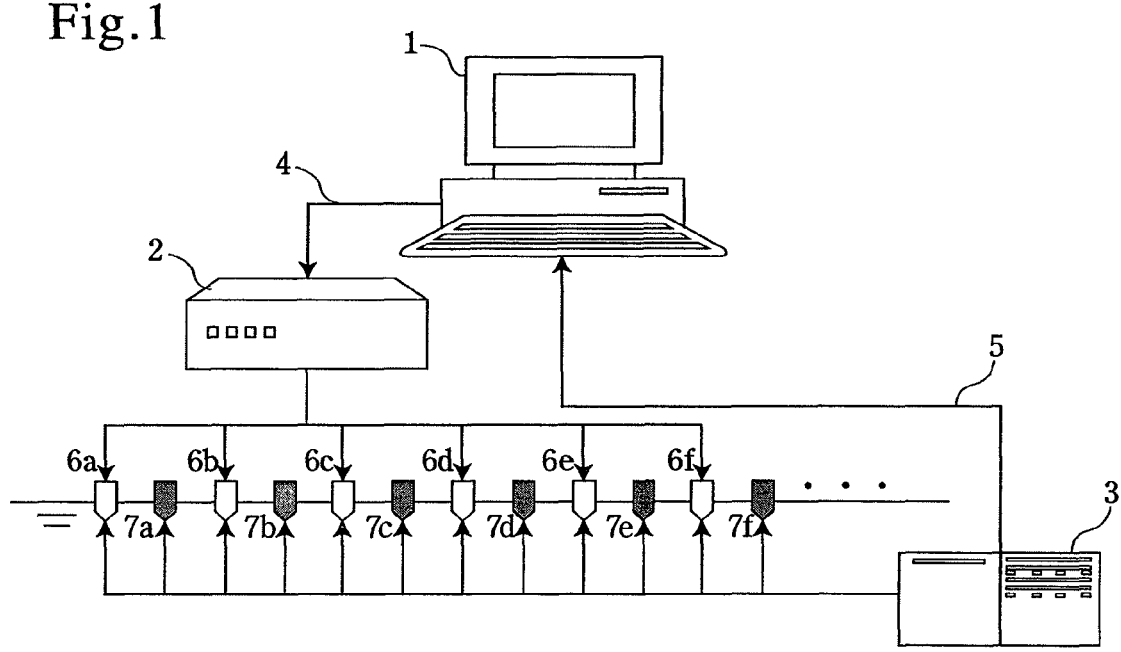
FIG. 1 shows an example of the configuration of a measurement system according to the present invention. Current electrodes 6a to 6f and potential measurement electrodes 7a to 7f are grounded. Current waveforms 4 generated by a personal computer 1 are transferred to a current transmission apparatus 2 for transmission. Current waveform data and observation potential waveform data 5 observed by a data logger 3 are transferred to the personal computer 1 for processing.

Reference numeral 1 denotes a computer in which software is incorporated which is required for generating current waveforms 4, controlling the transmission apparatus 2, and processing observation waveform data 5 observed by a data logger 3. Reference numerals 6a to 6f denote current electrodes. Reference numerals 7a to 7f denote potential measurement electrodes. Reference numeral 8 denotes a potential measurement electrode assumed in simulation. Reference numerals 9a to 9o denote transmission electrodes. Reference numerals 10a to 10o denote waveforms transmitted from the current electrodes 9a to 9o. Reference numeral 11 denotes response potentials assumed when current is transmitted individually through the current electrodes 9a to 9o. Reference numeral 12 denotes a potential waveform observed by the potential measurement electrode 8 when current is transmitted simultaneously through the transmission electrodes 9a to 9o. Reference numeral 13 denotes response potentials, at individual current transmission, calculated using the waveform 12 and the waveforms 10a to 10o according to the present invention.

BEST MODE FOR CARRYING OUT THE INVENTION

A system for achieving a preferred embodiment of the method of the present invention has a transmission control apparatus 2 that can provide current transmission to a plurality of points at any waveform 4, a data logger 3 observing potential waveforms, a personal computer 1 processing observed data 5 in real time, while controlling a transmission apparatus, and measurement processing software incorporated in the personal computer.

The transmission control apparatus 2 can be controlled by the personal computer 1 in real time. The transmission control apparatus 2 can simultaneously transmit current to multiple channels using respective optional transmission waveforms. The transmission control apparatus 2 is composed of, for example, a multi-channel D/A converter with amplifiers. In the data logger 3, the channels are insulated from one another, and each channel is insulated from a system bus. The data logger 3 satisfies observation specifications that depend on the period and amplitude of transmission current and the magnitude of assumed observation potentials. The data logger 3 needs to be controllable by the personal computer 1 in real time. The measurement processing software provides the function of separating the potential response for each of the transmission points by dividing the covariance of an observed potential waveform and a current waveform by the variance of the current waveform.

Embodiment 1

FIG. 1 shows an example of the configuration of a measurement system according to the present invention. The measurement system is composed of the personal computer 1, the transmission control apparatus 2, and the data logger 3. In the present invention, the current is transmitted from multiple points simultaneously and, therefore, potential measurement electrodes cannot be used also as current electrodes. Consequently, in the present example, the current electrodes 6a to 6f and the potential measurement electrodes 7a to 7f are alternately arranged. Furthermore, current waveforms need to be recorded in the data logger.

Figure 2:
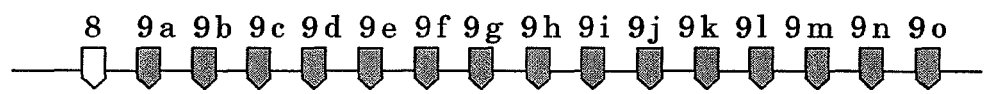
FIG. 2 shows the arrangement of electrodes assumed in simulation. Fifteen current electrodes 9a to 9o are grounded at constant intervals. Potential waveforms are observed by a potential observation electrode 8.
Figure 3:
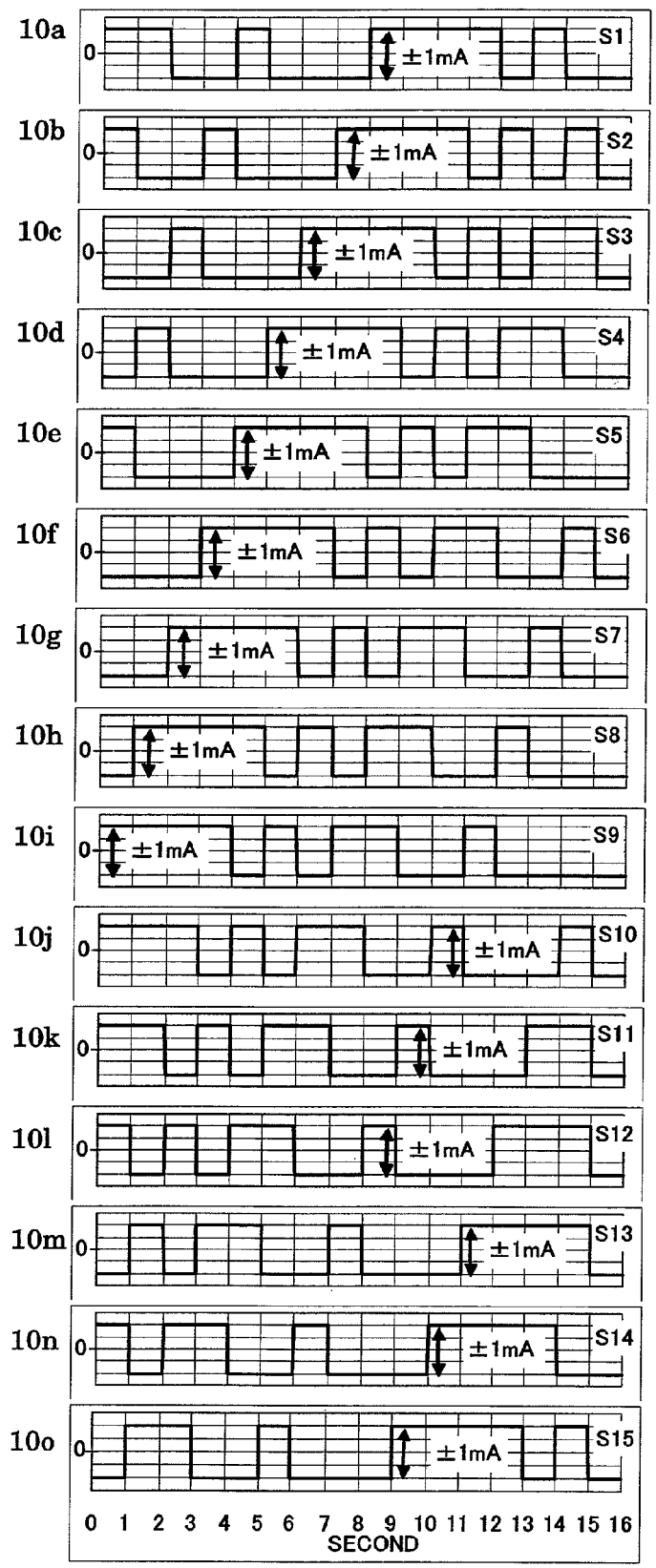
FIG. 3 shows current waveforms assumed in simulation. Waveforms 10a to 10o correspond to current waveforms fed through the current electrodes 9a to 9o. Four shift registers are used to create fifteen types of M-sequence codes composed of 1 and 0. Zero is added to the end of each of the codes so that the correlation between the codes is equal to zero. Based on the codes, fifteen types of waveforms with an average value of zero and an amplitude of ±1 mA are created as current waveforms. Each TIP is set to 1 second.
Figure 4:
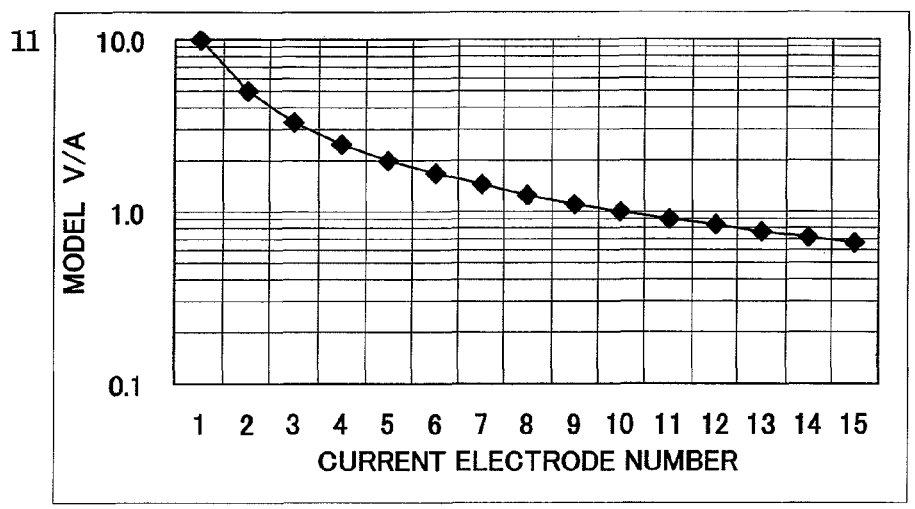
FIG. 4 sequentially shows, from the top of the figure, response potentials 11 observed when the current is transmitted from the electrodes 9a to 9o individually, an observed potential waveform 12 observed when the current is transmitted from the fifteen points simultaneously, and response potentials 13, at individual transmission, calculated using the current waveforms 10a to 10o and the observed waveform 12 according to the present invention. As expected by theories, the response potentials 11 are identical with the response potentials 13.
Figure 4:
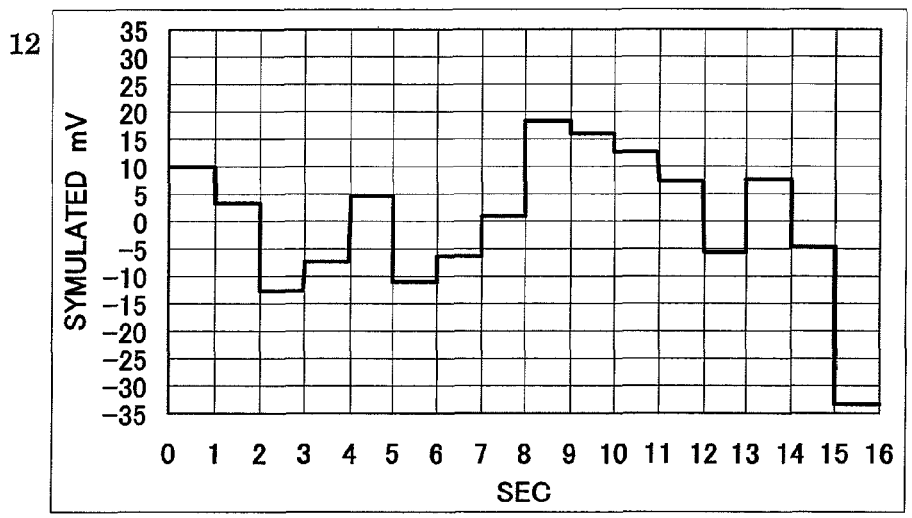
Figure 4:
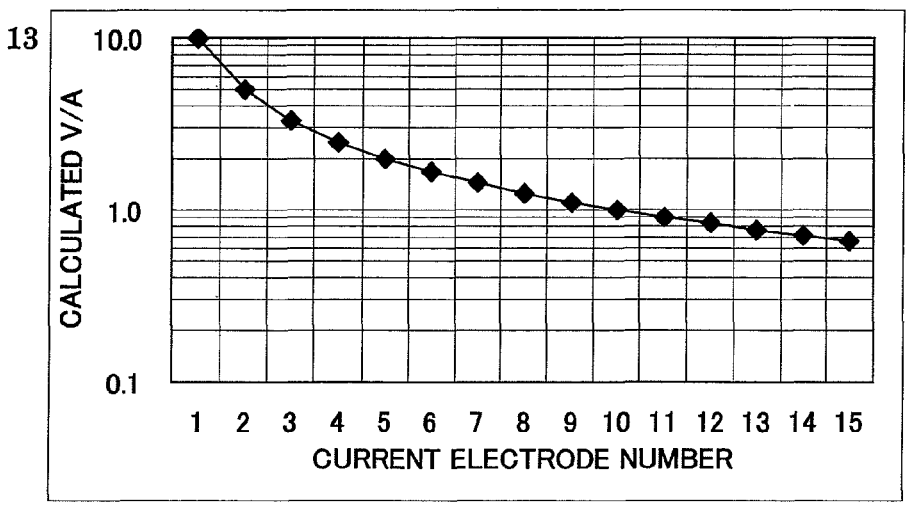

FIGS. 2 to 4 show the results of simulation of the present invention. FIG. 2 shows an assumed electrode arrangement. FIG. 3 shows assumed current waveforms. FIG. 4 sequentially shows, from the top of the figure, assumed response potentials, an observed potential waveform, and reproduced response potentials according to the present invention.

INDUSTRIAL APPLICABILITY

The present invention allows measurement time intervals to be set to a smaller value, thus enabling a real-time monitoring system based on electrical resistivity profiling to be implemented. Thus, underground dynamic phenomena such as underground water flow can be observed through change in resistivity. Consequently, electrical resistivity profiling and logging can be applied to monitoring of, for example, the process of soil contamination, the river water penetration of a levee at a flood, condition of an underground $CO_2$ capture, and subsea property at a methane hydrate mining.

The invention claimed is:

1. A measurement method of using a measurement system based on a simultaneous multi-point current transmission, the measurement method comprising:
    performing electrical resistivity profiling and logging by:
        simultaneously providing, to underground, a current transmission from each current transmission point of a plurality of current transmission points of the measurement system, the current transmission being simultaneously provided from the plurality of current transmission points using different current waveforms; and
        performing, via a processor of the measurement system, mathematical processing to separate response received when a current is transmitted independently, from potential waveforms observed at a separately provided potential measurement point,
    wherein a pseudo-noise signal is a current waveform for eliminating all covariance values between the different current waveforms to zero.

2. The measurement method according to claim 1, wherein in the performing of the mathematical processing, a covariance of an observed potential waveform and a current waveform is divided by a variance of the current waveform to determine, for any current transmission point, a response potential per unit current obtained when a current is independently transmitted from any current transmission point.

3. The measurement method according to claim 1, wherein in the current transmission, a current waveform created by adding zero to an end of each of a plurality of M-sequence codes generated by an identical shift register is used to eliminate all covariance values between the different current waveforms to zero.

* * * * *